Dec. 11, 1934. J. C. McINTYRE 1,983,557
CORN CUTTER
Filed June 11, 1930 5 Sheets-Sheet 1

Inventor
John C. McIntyre
By Pojsp and Powers
Attorneys

Dec. 11, 1934. J. C. McINTYRE 1,983,557
CORN CUTTER
Filed June 11, 1930 5 Sheets-Sheet 2
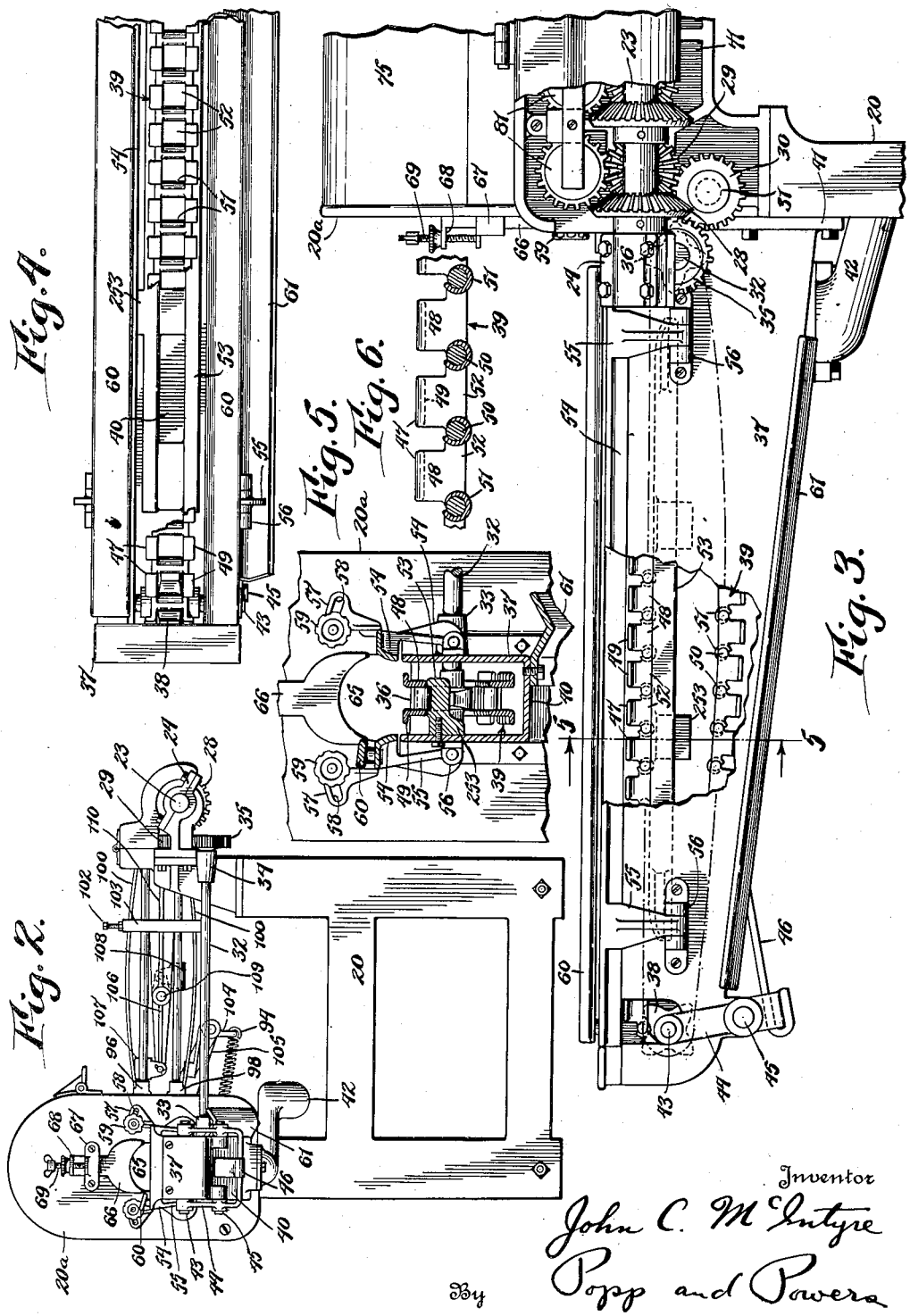

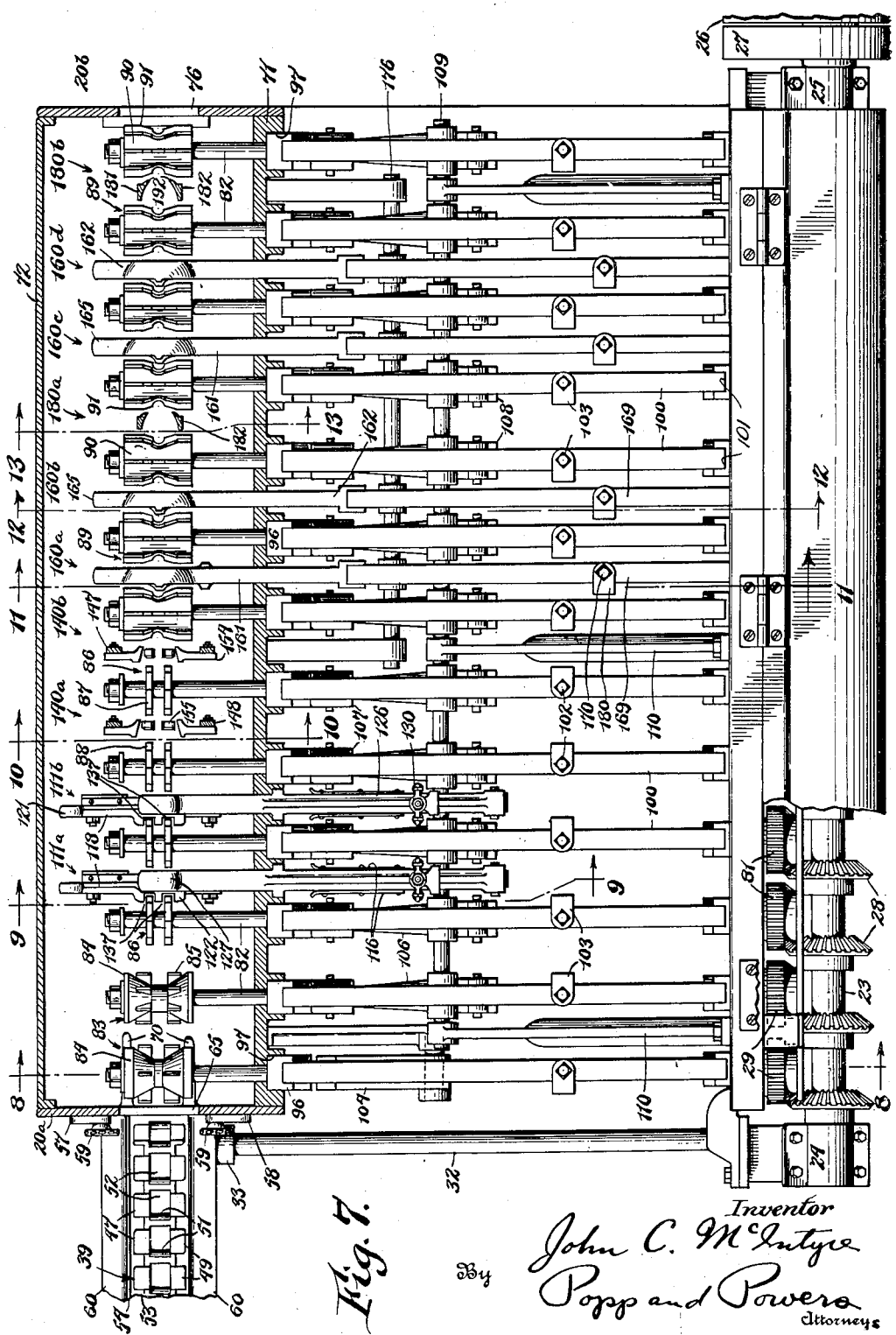

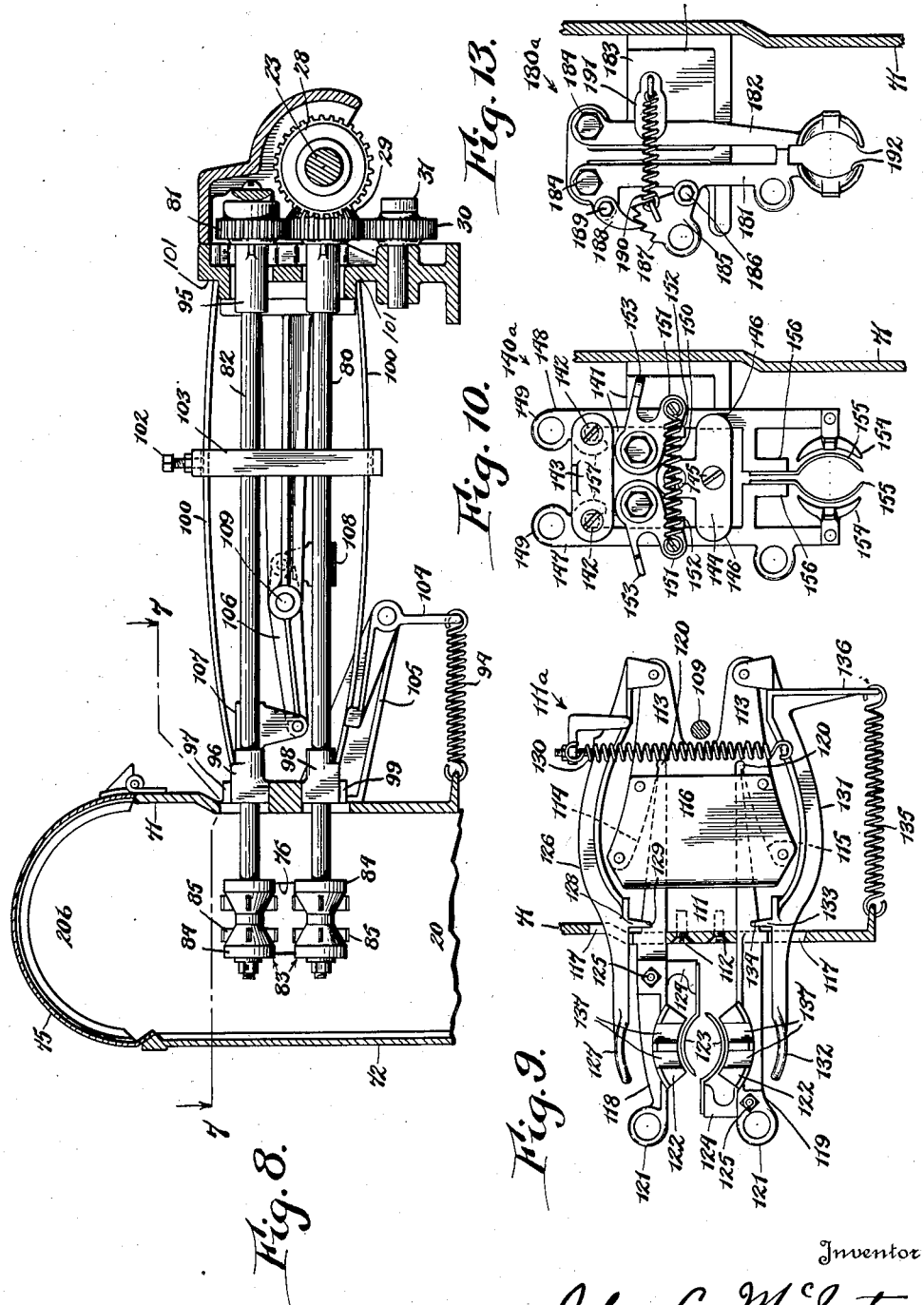

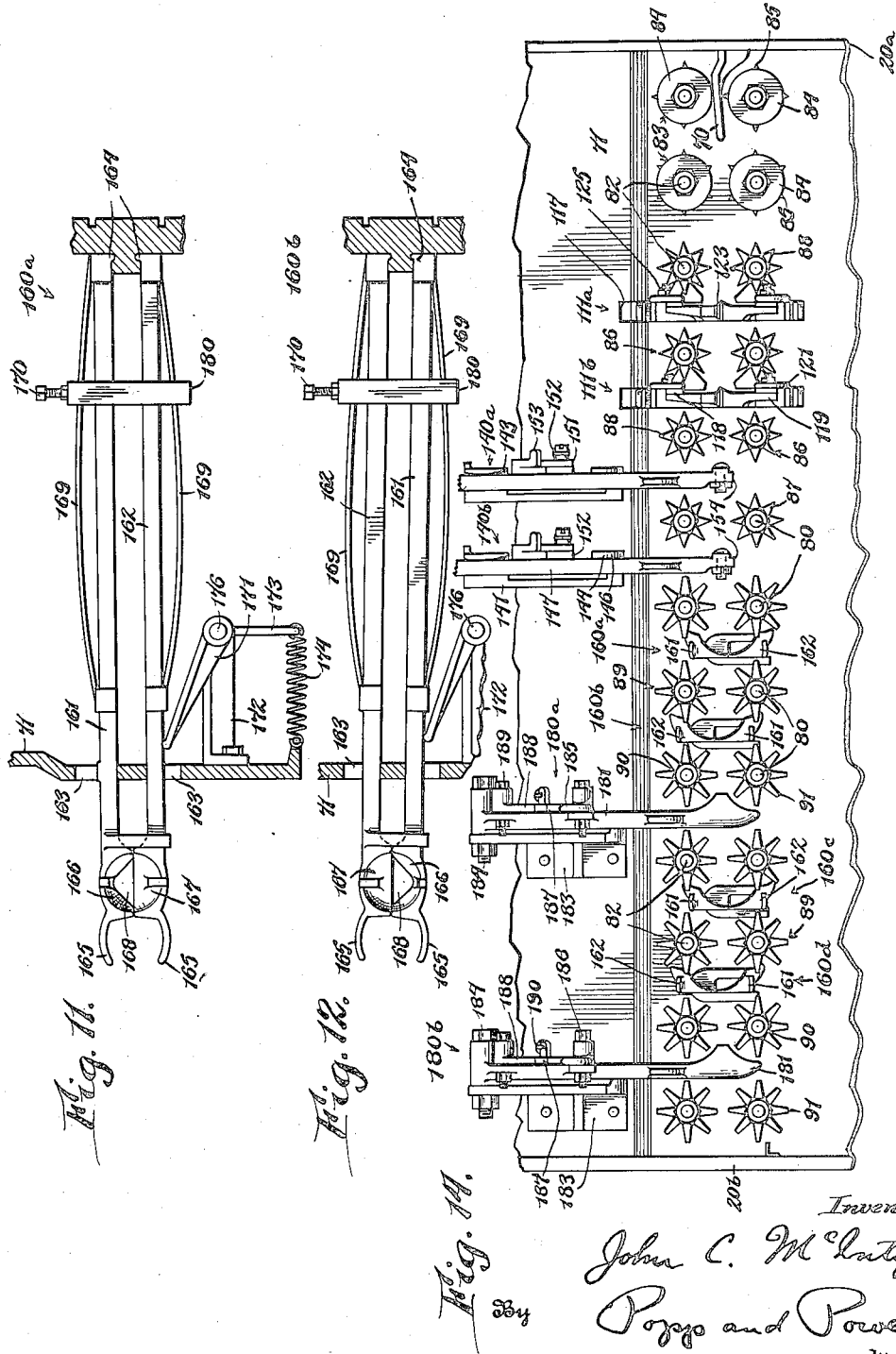

Patented Dec. 11, 1934

1,983,557

UNITED STATES PATENT OFFICE 1,983,557

CORN CUTTER

John C. McIntyre, St. Petersburg, Fla., assignor to Sprague-Sells Corporation, Hoopeston, Ill., a corporation of Delaware Application June 11, 1930, Serial No. 460,366

8 Claims. (Cl. 130—9)

This invention relates to machines for cutting green corn from the ear preparatory to canning and particularly to improvements in that general type of corn cutting machines in which the husked ears of corn are fed longitudinally between curved sharp knives and between blunt scrapers which cut and scrape the kernels from the cob; provision being made for automatically adjusting the cutting and scraping tools to conform to the different sizes of ears fed to the machine as also for manual adjustment of the tools to effect a cut of greater or less depth, and for the substitution of parts to effect at will a slitting of the kernels as well as a cutting and scraping.

This invention is an improvement on the corn-cutting machine shown and described in my Patent No. 1,215,563 dated February 13, 1917.

The general objects of this type of green corn cutter are to provide more efficient means for accurately feeding the ears of corn, for automatically centering the ear with reference to the tools and adjusting the latter to the size of the ear, for regulating the tension or yielding pressure of the tools by which they are held to their work, for controlling the depth of cut, and in short to provide a machine which shall comprise an exceedingly efficient, compact and flexible combination of elements cooperating to automatically remove the kernels of green corn from the ear in a thorough and efficient manner.

The more specific objects of the present invention are directed to certain specific advantages which the present invention possesses over my said patented construction, these specific objects being to provide cutting devices in which long outwardly projecting parts are eliminated so that the machine as a whole is more compact and can be entirely housed so that the entire cutting operation can be carried on in a tight enclosing casing; to so form the gages and cutting knives that they can be arranged more closely to the conveying spur wheels so that very short pieces of corn as well as long ears can be cut; to make the gages in one piece with the knife arms and to provide an adjustment for the knives on one side so that the knives can be conveniently adjusted; to arrange the detachable mounting for the knife arms in rear of the line of movement of the ears through the cutter and between the feed wheel shafts and thereby avoid the forward projection of the same which would render them more awkward and also interfere with their being completely housed; to effect a counter-balancing of the horizontal knife arms which causes the cutter or knife arms to practically float and bear with uniform pressure on both the top and the bottom of each ear instead of bearing entirely on top of the ear as heretofore; to provide a conveniently removable mounting for the upright cutter or knife arms; to provide handles on the knife arms and scrapers so that their tension can be easily tested in adjusting them to suit the tenderness of the corn; to provide a convenient means for so adjusting the tension of the knife arms and scrapers and releasing the same to provide an adequate clearance throat next to the base of each knife so that remnants do not clog the knife; to provide a skeleton or recessed guide for the ears being conveyed to the cutters so that small pieces of husk and refuse can drop through the feed belt before being conveyed to the cutter; to provide swinging side guides for the ears being conveyed to the cutter mechanism so that they adapt themselves to corn of very large diameter as well as corn of very small diameter; to provide an inclined drip pan or trough under the conveyor to catch and convey the drippings from the machine; to provide a movable guard adjacent the inlet aperture from the feeding conveyor to the cutting mechanism so that if ears should be arranged one on top of the other the upper one will be held back and prevented from entering the cutting mechanism; and to provide horns or guides for directing the ears from said inlet aperture to the first pair of conveying spur wheels so that short pieces of ears will be properly presented and cut as well as long ones.

In order that the invention may be readily understood a complete practical embodiment of the same is set forth in the accompanying drawings and in the detailed description based thereon. As, however, the invention is capable of embodiment in other and varied constructional forms the description and drawings are to be construed in an illustrative and not in an unnecessarily limiting sense.

In the accompanying drawings:

Figure 2 is an end view thereof viewed from the feeding end.

Figure 3 is an enlarged fragmentary rear elevation of the feeding conveyor mechanism and a part of the cutting mechanism, parts of the structure being broken away to disclose the moving parts.

Figure 4 is a fragmentary top plan view of the feeding conveyor and its associated parts.

Figure 5 is a vertical section taken on line 5—5, Fig. 3.

Figure 6 is a vertical longitudinal central section through a length of the upper stretch of the conveyor chain or belt.

Figure 7 is a horizontal section taken generally on line 7—7, Fig. 8, and showing the cutter mechanism and its driving mechanism in plan.

Figure 1:
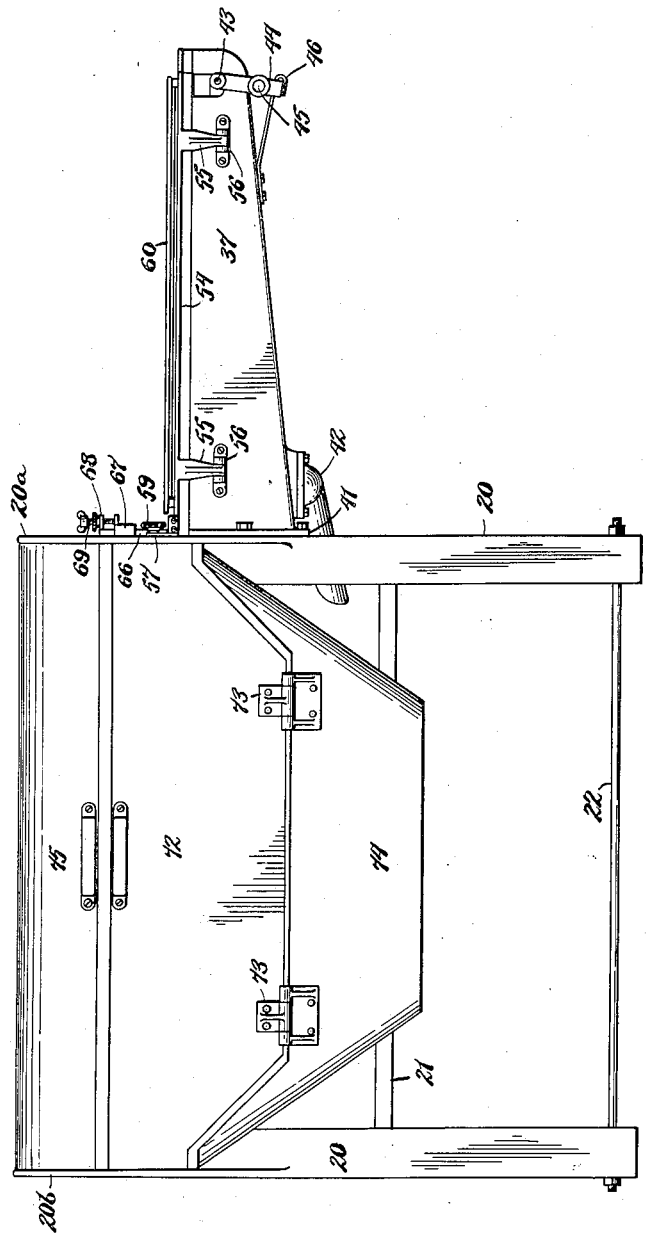
Figure 1 is a complete front elevation of a green corn cutter embodying my invention, the cutters, scraper and conveying wheels of the corn cutter being completely housed.

Figures 8 to 13 are vertical sections taken on the correspondingly numbered lines on Fig. 7, Fig. 8 showing the first conveyor wheels, Fig. 9 showing the first pair of horizontal knife or cutter arms, Fig. 10 showing the first pair of vertical knife or cutter arms, Fig. 11 showing the first pair of horizontally disposed scraper arms, Fig. 12 showing the second pair of horizontal scraper arms, Fig. 13 showing the first pair of vertically disposed scraper arms.

Figure 14 is a front elevation of the cutting and scraping mechanism showing the housing opened up.

Similar reference numerals refer to like parts in each view.

In its general organization this invention comprises a green corn cutter composed of a horizontal feeding conveyor belt or chain supported so that remnants and pieces of husk can fall through to the drip pan or trough below, adjustable side guards along the sides of the upper feeding stretch of the conveyor, these being set for different sized ears, an aperture through which the ears are fed to the corn cutter, a movable guard over said aperture which moves to accommodate large sized ears but prevents the passage of an ear resting on top of another ear, a pair of horns on the outlet side of said aperture and serving to direct the ears to the corn cutter and a corn cutter consisting of two series of spring mounted conveyor spur wheels between which the ears are conveyed horizontally from the inlet opening to a cob outlet opening, a set of two pairs of horizontal cutter arms between the conveying wheels each pair carrying knives which successively shave off the kernels from the top and bottom of the ear, a set of two pairs of vertical cutter arms which similarly operate to shave off the kernels from the sides of the ear, and a plurality of scraper arms which are formed to engage different parts of the ear and scrape the balance of the kernels therefrom as it is conveyed by said wheels.

The machine is shown as supported on end standards 20 which are connected by upper and lower longitudinal braces 21 and 22, respectively. The main shaft 23 is suitably journaled at 24 and 25 on the end standards 20 and has mounted thereon fast and loose pulleys 26 and 27 which are adapted to be driven by means of a belt (not shown).

A series of spaced bevel gears 28 are fixed on the main shaft 23, and each of these bevel gears 28 mesh with a gear 29 having spur and bevel teeth and being fixed upon the lower of two tool shafts arranged in pairs, one above the other, as will be hereinafter more fully explained.

At the right hand or feeding end of the machine, an idle gear 30 is rotatably mounted on a stub shaft 31, this gear, as best shown in Figs. 3 and 8 meshing with the spur teeth of the adjacent gear 29 carried by said lower tool shaft and by which the rotary movement of the main drive shaft 23 is transmitted to the idler 30. This idler 30 drives a countershaft 32 which is suitably journaled in the machine frame at 33 and 34 and carries a pinion 35 which meshes with the idler 30, as best shown in Figs. 2 and 3. A sprocket wheel 36 is fixed to this countershaft 32, this sprocket wheel being arranged in a feeding trough 37 which carries a second sprocket wheel 38 at its opposite or outer end. These sprocket wheels 36 and 38 carry a feeding or conveyor chain 39 as hereinafter described, the ears of corn being placed upon the upper stretch of this chain and being conveyed thereby to the cutting mechanisms.

As best shown in Figs. 1 to 5, the trough 37 consists of a casting which is U-shaped in cross section, the bottom 40 inclining downwardly toward the cutter mechanism and the trough being open at its top. At its inner end the trough is provided with a flange 41 extending outwardly around the sides and bottom of the trough by means of which the trough is bolted to the machine frame and at this end an outlet spout 42 through which water, juices and pieces of silk and the like from the corn on the conveyor 39 drain out from the trough 37.

To permit of readily removing the conveyor chain 39, the shaft 43 of the idle outer sprocket 38 is preferably mounted on the upwardly extending legs of a yoke 44, this yoke being pivoted to the opposite sides of the trough 37 as indicated at 45, and the lower end of the yoke being held by a brace 46. The conveyor chain 39, as best shown in Figs. 3 to 6, consists of a plurality of links 47 each consisting of a pair of upright side walls 48, these side walls being enlarged or flanged outwardly at their outer ends as indicated at 49. At one end the side walls 48 of each link are connected by a cross pin 50 and the opposite end of each link is formed to provide a knuckle 51 which grasps the cross pin 50 of the next succeeding link. By this means the links of the chain 39 are provided with regular openings 52 which receive the teeth of the sprocket wheels 36 and 38 and at the same time each ear of corn is supported at opposite sides by the spaced walls 48 and flanges 49 of the links so that upon throwing the ear upon the same, the conveyor chain 39 tends to straighten the ear into parallelism with the chain and convey it in proper position to the corn cutting mechanism. It is also desirable to have the upper or operative stretch of the conveyor chain straight and to avoid sagging of this stretch, the same rides in a track 53. This track, as best shown in Figs. 3 to 5 is grooved on its upper sides and the ends thereof are curved so that the upper stretch of the conveyor chain 39 freely rides on to and off the same, and the track is supported from the trough 37 by a pair of brackets 253 which are formed integrally with the track 53 and are suitably bolted to one of the side walls of the trough 37.

Corn of different sizes is operated upon ranging from the very small ears of the Golden Bantam variety to the large ears of Stowell's Evergreen. To insure the proper placement of the ears upon the conveyor chain 39, adjustable gage plates 54 are provided which are arranged along substantially the entire length of the trough 37 and are adjustably movable toward and from one another. As best shown in Fig. 5, these gage plates or bars are rounded on their opposing sides and are carried by integrally formed arms 55, these arms being pivoted to ears 56 on the outside of the trough 37 and being connected to the outer sides of the gage bars 54 so that the gage bars can be projected over the sidewalls of the trough 37. To hold these gage bars 54 in adjustment, a bracket 57 is integrally connected to the inner end of each bar and is provided with an arcuate slot 58 which is concentric with the pivotal mounting for the bars. In each of these slots is arranged a stud screw which projects outwardly from the head 20a of the machine frame and carries a hand wheel 59 which hand wheel is adapted to be tightened against the bracket 57 so as to hold the gage bars 54 in position. It is apparent when small ears are to be cut, that upon loosening the hand wheels 59, the brackets 57 and gage bars 54 can be moved together to provide a narrower track for the ears, or when larger ears are being cut that they can be moved apart. If desired a hand rest 60 can be provided on which the person feeding the ears of corn can rest his hands. This hand rest is shown as a longitudinal bar which is supported in any suitable manner upon each of the gage bars 54 a short distance above the same. To catch the drippings flowing down the outside of the rear wall of the trough 37, a gutter 61 is also provided, this gutter being suitably bolted to the underside of the trough and conducting such juices toward the corn cutter where they can be collected.

Upon being placed on the conveyor 39, preferably tip first, the corn is propelled through an opening 65 in the head 20a of the machine frame 20. This opening must be sufficiently large to let the largest size of ears through and as such a large size might permit the passage of two small ears accidentally laying one on top of the other, a movable guard is provided. This guard consists of a plate 66 which is curved on its underside and is slidingly carried for vertical movement between a bracket 67 and the outside of the head 20a. The upper end of the slide 66 is formed to provide an outwardly projecting ear 68 which carries a vertical stop screw 69, this stop screw being adapted to engage the bracket 67 and limit the downward movement of the slide 66 and determine the effective size of the opening 65. By this means the tapered end of each ear of corn passes under the slide 66 and if it is of large size it lifts the slide 66 and passes through. If, however, two small ears should be accidentally placed one on top of the other, the lower ear will pass through the opening 65 but the tip of the upper ear will strike the slide 66 and be held back until the lower ear has passed through the opening.

For the purpose of insuring the proper delivery of the ears to the conveying wheels, hereinafter described, two horns 70 project inwardly from the head 20a and support the opposite sides of each ear at the time of transfer from the feeding conveyor 39 to the internal conveying and cutting mechanisms. These horns can be of any suitable form to avoid the moving parts of the cutting mechanism and are arranged immediately below the opening 65 and are within the casing so that they hold up the ears immediately after the ears pass through the opening 65.

The cutting parts of the corn cutting mechanism are housed within an enclosing casing consisting of a bearing plate 71 extending between the end heads 20a and 20b of the machine frame, a front metal plate 72 which extends between these heads and is preferably hinged as indicated at 73 to a lower hopper 74 which hopper is supported from the machine frame in any suitable manner and receives the cut kernels of the corn and these kernels being subsequently put through a silker (not shown). The upper part of this enclosing casing consists of a rounded cover 75 which extends between the heads 20a and 20b of the machine frame and rests on the upper edge of the front plate 72 and is hinged to the bearing plate 71. The ears are conducted longitudinally through this casing and after the kernels are cut and scraped, the cob is discharged through an outlet opening 76 in the end head 20b of the machine frame. It is apparent that this casing completely encloses the working parts of the cutting and scraping mechanism against contamination from the dust and dirt in the air and at the same time provides ready access for cleaning, adjustment and repair of these parts.

Extending transversely of the machine is a series of pairs of tool shafts, the members of each pair being arranged one above the other, and the lower tool shafts 80 of each pair having fixed upon its rear end one of the spur and beveled gears 29 previously referred to, these gears 29 each meshing with one of the bevel gears 28 upon the main drive shaft 23. The spur teeth of each of these lower tool shafts 80 also meshes with a spur gear 81 fixed to the rear end of the upper tool shaft 82, these intermeshing gears 29 and 81 being of the same size so that the upper and lower tool shafts 80 and 82 are rotated at equal speeds in opposite directions. The front ends of the tool shafts 80 and 82 project forwardly through the bearing plate 71 and within the enclosing casing housing the cutting elements carry various rotary members which cooperate to advance the ears of corn longitudinally of the casing from the inlet 65 to the outlet 76 and to present the same successively to the various tools arranged to act thereon.

The first two pairs of tool shafts 80 and 82 which are arranged adjacent the inlet opening 65 in the machine frame head 20a, have mounted upon their front ends spur wheels 83 arranged in spaced relation above and below the horns which guide the ears of corn therebetween. These four spur wheels, as best shown in Figs. 7, 8 and 14 each consist of an inwardly coned or hour glass shaped hub 84 having sharpened, flat, radial knife teeth 85 which are adapted to dig in between the kernels of the ears passing between the spur wheels and separate the same.

The four successive pairs of tool shafts 80 and 82 carry spur wheels 86, each of which as best shown in Figs. 7 and 14, consist of a pair of spaced disks 87 which are formed to provide long tapered teeth 88. The succeeding pairs of spur gear wheels 89 each consists of a single relatively long hub 90, which is formed to provide a series of comparatively blunt teeth 91 which extend the length of the hub but are recessed at their center to insure the passage of the ears in centered relation thereto. The particular shape of the various spur gears is largely determined by their position with relation to the scraping and cutting tools, the object beng to render the machine as a whole as compact as possible and at the same time avoid the danger of any interference between the spur gears and these cutting and scraping tools. As the upper tool shafts 82 rotate oppositely and at the same speed as the lower tool shafts, it is apparent that the ears of corn will be propelled at a uniform speed between the pairs of spur wheels carried thereby from the inlet 65 to the outlet 76.

The ears of corn operated upon vary in size and it is therefore apparent that the upper and lower tool shafts 82 and 80 must be yieldingly movable toward and from one another so that the different sized ears will be held with uniform pressure by the spur wheels carried thereby. Means are provided which permit of such yielding movement of the tool shafts 80 and 82 and at the same time insure the uniform movement of the tool shafts from a common center so that the path of the ears through the machine is always the same regardless of their size. These means are preferably constructed as follows:

The rear ends of the tool shafts 80 and 82 are housed in bearings 95 which can be of any suitable form and permit the front ends of these shafts to move toward and from one another. The front ends of the upper tool shafts 82 are each journaled in a sliding bearing block 96, this bearing block being slidable upwardly in a slideway 97 provided in the rear side of the bearing plate 71 adjacent each of the openings through which each upper tool shaft 82 is projected forwardly through the bearing plate 71. In a similar manner each of the lower tool shafts 80 has its front end journaled in a sliding bearing block 98, this bearing block 98 being slidable downwardly in a slideway 99 provided in the rear side of the bearing plate 71 adjacent each of the openings through which the lower tool shaft 80 is projected forwardly through the bearing plate. These sliding bearing blocks 96 and 98 are yieldingly pressed together by means of leaf springs 100 which springs are suitably anchored at their rear ends on the main frame as indicated at 101 and at their front ends bear against the outer sides of the sliding blocks 96 and 98 so as to urge them inwardly. The tension of the springs 100 is regulated by means of set screws 102 in the arms of a plurality of yokes 103, so that the pressure of both the upper and lower tool shafts 82 and 80 and their spur wheels is uniformly regulated at will.

The first pair of tool shafts 80 and 82 which carry the spur wheels 83 which initially receive the ears are entirely free to move toward and from each other or to move up and down in unison in order that the same are free to adapt themselves to the size of the ear of corn presented by the horns 70. The weight of this first pair of tool shafts is, however, carried by a spring 94 which, as best shown in Fig. 8, is connected to an ear in the machine frame and exerts a forward tension on the lower arm of a bell crank lever 104. The bell crank lever is pivoted to the rear end of a fixed arm 105 and its upper arm bears against the under side of the lower leaf spring 100 supporting the first lower tool shaft 80 so that the spring 103 yieldingly supports both of the first pair of tool shafts. By this means the first or receiving pair of spur wheels 84 are free to float and move in any manner to adapt them to the size of the ear received between them.

The remaining upper and lower tool shafts 80 and 82 are equalized in their movement toward one another so that the ears are at all times maintained in centered relation to the scraping and cutting devices to which they are fed. This is accomplished by means of an equalizing arm 106 for each set of tool shafts 80 and 82, the front end of each of these arms being pivoted to a sleeve 107 which slides upon the corresponding upper tool shaft 82 while the other end is pivoted to a sliding sleeve 108 which slides upon the lower tool shaft 80. All of these equalizing arms 106 are fulcrumed upon a rod 109 which extends lengthwise of the machine between the upper and lower series of tool shafts. This rod 109 can be carried by the machine frame in any suitable manner as by the provision of supporting arms 110. It will be noted that the equalizing arms 106 are each fulcrumed at a point unequally distant from their ends to compensate for the unequal distance separating the sleeves 107 and 108 from the rear ends of the shafts 80 and 82 about which ends the shafts swing and this unequal spacing causes the tool shafts of each pair and their spur wheels to move an equal distance from a common center when either is forced outwardly.

The first operation upon the ears of corn propelled through the machine by the spur wheels is to cut or shave off the kernels on the upper and lower sides of the ears, this being effected by the first cutting device indicated generally at 111a which is arranged between the first and second pairs of spur wheels 86, and, as best shown in Figs. 7, 9 and 14, is preferably constructed as follows:

The numeral 111 represents a comparatively high and thin stationary block which is secured to the rear side of the bearing plate 71 by means of screws 112 and projects rearwardly therefrom, this block being arranged between the third and fourth pairs of tool shafts 80 and 82. At its rear end this block 111 is bifurcated to avoid the rod 109, forming upper and lower arms 113. The block 111 is also formed to provide an upper forwardly opening jaw 114 and a lower forwardly opening jaw 115, and to the opposite sides of these jaws and the block 111 a plate 116 is secured, the front edges of these plates being curled outwardly so as to permit of the ready insertion of parts between each of the jaws 114 and 115 and the block 111 and plates 116. In front of the jaws 114 and 115 openings 117 are provided in the bearing plate 71, and through these holes an upper knife or cutter bar or arm 118 and a lower knife or cutter bar or arm 119 are inserted so that their rear ends are caught in the upper and lower jaws, respectively of the block 111, these cutter bars or arms being guided in their insertion by the rounded front edges of the plates 116. These bars or arms are movable toward and from one another and to provide a reliable bearing for these arms in the jaws 114 and 115, the rear ends of both are rounded, as indicated at 120. Each of the cutter bars or arms is formed to provide an eye 121 by which it is withdrawn and inserted and which also permit the tension of the bars to be tested in adjusting this tension to the tenderness of the corn. Each bar is also formed to provide a rounded inward projection 122 forming the segment of a throat through which the ear is forced. These portions 122 are each curved to fit around the body of the passing ears and taper toward the ear being presented so as to guide the ear into the throat or space between the portions 122. In addition the forwardly tapering part of the portions 122 are each provided with a pair of recesses 137 in which the teeth 87 of the preceding spur wheel 86 travel. By providing these recesses, the preceding pair of spur wheels 86 can be arranged close to each of the devices 111a and 111b and not only are the short ears of corn fed more reliably to these devices but the machine as a whole can be made more compact. The cutting of the kernels is effected by knives 123, the sharpened part of each of which is rounded to conform to the shape of the ear of corn and this rounded part being set a short distance inwardly from the lower ends or throat segments 122 so that the cut or shaved kernels of corn will pass between the knives 123 and the curved ends 122 and will not foul the same. One end of each of these knives 123 is free and the other end is secured to a block 124. Each of these blocks is adjustably secured to the corresponding cutter bar 118 or 119 by means of a bolt 125, this connection being effected in any suitable manner so that the supporting blocks can be moved to adjust the knives 123 to any desired position upon loosening the bolts 125.

The cutter bars 118 and 119 are held in position and are yieldingly held together by means which also permit the cutter bars to float in unison and adjust themselves to the ears, these means being preferably constructed as follows:

Pivoted to the rear end of the upper arm 113 of the block 111 is a latching and presser bar 126 which extends forwardly through the opening 117 and at its front end is formed to provide a handle 127 by means of which it can be conveniently raised. This arm is provided with a latching tooth 128 which projects downwardly and is adapted to engage a notch 129 in the upper cutter bar 118 so that when the tooth 128 is so caught, the upper cutter bar 118 cannot be pulled out without first raising the latching bar 126. This latching bar 126 is also formed to provide an ear which is connected with the upper ends of a pair of tension springs 130.

The lower ends of these springs 130 connect with a lower latching bar 131 similarly provided with a handle 132 and a tooth 133 engaging in a notch 134 in the underside of the lower cutter bar 119. It is apparent that by these latch bars, both of the cutter bars 118 and 119 are held against withdrawal and at the same time the springs 130 yieldingly hold the cutter bars together. The entire assembly is spring supported so that all of the bars can move in unison or float to adapt themselves to the ears by a tension spring 135 which is anchored at its front end on the main frame and at its rear end is connected to a depending arm 136 on the lower latching bar 131.

It is apparent that by arranging the detachable mountings for the knife or cutter bars or arms 118 and 119 in rear of the line of movement of the ears of corn that an awkward forward projection of the same is avoided and the same can be entirely housed. The counter-balancing of the horizontal knife arms 118 and 119 also causes them to float and bear with uniform pressure on both the top and bottom of the ears.

The second operation upon the ears of corn is that of taking a second slice or cut off the upper and lower sides of the ear by a system of cutters indicated generally at 111b, this system being arranged between the fourth and fifth pairs of spur wheels. As this system of cutter arms is identical in construction and operation with that indicated at 111a, just described, this description will be deemed to apply to both.

The next succeeding operations upon the ears comprises cutting or slicing the kernels from the opposite sides of the ear, this being accomplished by two systems of side cutters indicated generally at 140a and 140b, the first being arranged between the fifth and sixth pairs of spur wheels and the second being arranged between the sixth and seventh pairs of spur wheels. As these systems are identical in construction and operation, a description of one will be deemed to apply to both. The system 140a, as best shown in Figs. 7, 10 and 14, is preferably constructed as follows:

Mounted on the front side of the bearing plate 71 between the fifth and sixth pairs of tool shafts 80 and 82 is a supporting block 141 which projects forwardly and at its upper end carries a pair of screws 142, these screws supporting a plate 143 at their outer ends, suitable spacing sleeves being provided around the screws 142 to hold the plate 143 in spaced relation to the supporting block 141. A lower abutment block 144 is fastened to the supporting block 141 by means of screws 145 or in any other suitable manner, this abutment block being provided with front and rear ears 146. Removable outer and inner side cutter bars 147 and 148 are carried by this structure, each of these bars being formed to provide an eye 149 by which it is conveniently removed and being also provided with a hook-shaped lip 157, this lip being adapted to hook over the shank of the corresponding screw 142 so that each side cutter bar is suspended from one of these screws and the bars depend between the side of the supporting block 141 and the plate 143 and ears 146. This method of supporting the bars 147 and 148 by the lips 157 greatly facilitates their removal. These side cutter bars are yieldingly and removably held in this position by a tension spring 150, this spring connecting two latching arms 151 which are pivoted to the front and rear parts of the supporting block 141 above the spring 150. These latching arms 151 are held against stops 152 which project outwardly from the side cutter bars 147 and 148 so that the tension of the latch arms 151 holds the cutter bars 147 and 148 together in proper position for cutting. Each of the latch arms 151 is also formed to provide a finger piece 153 by which the latch arms are moved to release the cutter bars and these latch arms 151 are arranged so that the tension spring 150 will move upwardly beyond the dead centers of the latching arms 151 and thereby hold these latching arms 151 in their upper or inoperative positions.

To the lower ends of the cutter bars 147 and 148 opposing curved tapered guides 154 are provided, these guides forming the throat through which the ear of corn is propelled and serving to separate the cutter bars 147 and 148 in accordance with the size of the ear. The free end of each of the cutting knives 155 is curved and is spaced a short distance in from the corresponding curved guide or throat 154 on the cutter bar so that the sliced kernels freely pass between each knife 155 and the corresponding throat segment 154 without fouling the same. The upper straight end of each of these knives 155 is secured to a corresponding inward projection 156 on one of the side cutter bars 147 or 148, these knives being preferably so connected to these projections 156 that they are adjustable with relation to the guides 154.

After the kernels have been shaved or sliced by the cutting devices, a substantial part remains on the cob and the cob is therefore passed through a series of scrapers.

The first of these scrapers indicated at 160a, as best shown in Figs. 7, 11 and 14 consists of a pair of horizontal arms 161 and 162 which extend through openings 163 in the bearing plate 71 and are fulcrumed at their rear ends on the machine frame as indicated at 164. The front end of each of these scraper arms is formed to provide a handle 165 by which the tension can be conveniently tested and the scraping is effected by two heads 166 and 167, the two heads forming a cup which receives the end of the ear of corn and a triangular opening 168 through which the ears are forced and the scraper arms spread. In the first scraper 160a, this opening is formed in the upper scraper arm. The two scraper arms 161, 162 are held together by leaf springs 169 which bear against the outer sides of these arms, and the tension of these springs is adjusted by a set screw 170 in the arms of a yoke 180 which embraces both springs. The scraper arms are supported in such manner that they are free to float in unison and adapt themselves to the ears by a rock arm 171 which is pivoted to a rod 176 supported by brackets 172 and this arm 171 is yieldingly held elevated and in supporting engagement with the underside of the arm 162 by an arm 173 which is connected to the bearing plate by a tension spring 174.

The second pair of scraper arms, indicated at 160b, and shown in elevation in Fig. 12, is of the same general form as the first pair 160a, except that the triangular opening 168 is provided in the lower scraper arm instead of the upper scraper arm as in Fig. 11. This is accomplished by a reversal of the scraper arms 161 and 162 in position and provides scraping on six sides of the cob.

After the first pairs of horizontal scrapers 160a and 160b, the ears of corn are passed between a pair of vertically disposed scrapers, indicated at 180a, the arms 181 and 182 of which are pivoted to a bracket 183, as best shown in Figs. 7, 13 and 14, by means of removable pivot pins 184. A lever 185 is pivoted at 186 to the arm 181 and has formed integral therewith a rack 187, this rack being engaged by a pawl 188 pivoted at 189. This lever 185 is fastened to a tension spring 190 the other end of this spring 190 being connected to a plate 191 carried by the scraper arm 182. By the lever 185, the tension of the spring 190 can be increased or decreased as desired and maintained by engagement of the pawl 188 with the rack 187. The lower opposing edges 192 of the vertical scraper arms 181 and 182 are preferably formed symmetrically upon the arc of a circle about the axis of the ears as they are fed therebetween.

After the ears have passed the vertical scrapers, the identical scraping action is repeated by scrapers 160c, 160d, and 180b, these three scrapers being duplicates of the corresponding scrapers 160a, 160b and 180a of the first series of scrapers. This last scraping insures the scraping of all of the kernels from the cob, the completely scraped cob being discharged through the outlet opening 76 entirely cleaned and freed from its kernels.

From the foregoing description it is apparent that the ears of corn, deprived of their husks when placed in the feed trough 37 one at a time are conveyed endwise under the baffle plate 66 and through the inlet opening 65 by the conveyor chain 39 and over the horns 70. These horns direct them between the first pair of spur wheels 83 and the ear is thereafter moved through the machine between the series of pairs of spur wheels 83, 86 and 89. In this movement, the ears are carried between the cutter and scraper arms of the devices 111a, 111b, 140a, 140b, 160a, 160b, 180a, 160c, 160d and 180b. In passing these devices the kernels are scraped from the cob which is discharged through the discharge opening 76 and the cut kernels fall through to the hopper 74.

As to the specific features of improvement in the present invention it will be noted that the machine is compact and that the spur wheels and the cutting and scraping devices 111a, 111b, 140a, 140b, 160a, 160b, 180a, 160c, 160d and 180b are completely housed so that the danger of contamination is reduced; that the cutting devices 111a and 111b are arranged close to their preceding spur wheels by the provision of recesses 137 in the throat segments 122 of the cutter arms of these devices; that the ends of the cutter arms forming the throat segments 122 in the cutting devices 111a and 111b are made integral with the cutter arms; that each of the cutter or knife arms of the devices 111a, 111b are mounted in rear of the line of movement of the ears, thereby avoiding forward projections which would interfere with the complete housing of the working parts; that each of the horizontal knife arms of the devices 111a and 111b are counter-balanced so as to cause them to float and bear with uniform pressure on both the top and bottom of the ears; that both the upright and the horizontal knife arms of the devices 111a, 111b, 140a and 140b are conveniently removable and adjustable and are reliably held in their proper operative position while in use; that each of the scraping and cutter devices is provided with convenient handles for the testing of its tension in regulating the pressure with which they bear upon the passing ears, and that such tension is conveniently adjustable; that the provision of the horns 170 for guiding the ears from the conveyor 39 to the first pair of spur wheels 83 insures the proper delivery of the ears; that the feeding trough 37 is conveniently adjustable to different sized ears by the provision of the movable guide plates 54 at its sides; that this trough 37 is formed to convey away the drippings from the corn; that the guard 66 over the inlet opening 65 prevents the passage of two ears of corn and at the same time moves to accommodate any size of single ear presented; that the feeding chain 39 is formed to engage both sides of the ears and avoids the use of double chains, heretofore used; and that adequate clearance is provided between the knives 123 and 155 of the devices 111a, 111b, 140a and 140b and the adjacent gaging throat of each cutter arm so that pieces of kernels, silk and the like are not liable to clog the knives.

The machine is also comparatively simple in construction and operation and will function reliably, continuously and efficiently to sever the kernels of corn from husked ears without getting out of order or requiring adjustment.

Having fully described my invention, I claim:

1. In a machine of the character described, a support, a pair of cutter arms insertable longitudinally in said support and bearing at one end against said support, a knife carried by each of said cutter arms, means for conveying an ear of corn between said knives to sever the kernels therefrom, a pair of presser arms each independently pivoted at one end to said support adjacent said bearings, said presser arms extending along parallel with said cutter arms and the free ends of said presser arms bearing against the outer sides of the free ends of said cutter arms and means for yieldingly holding said presser arms together.

2. In a machine of the character described, a support, a pair of cutter arms insertable longitudinally in said support and bearing at one end against said support, a knife carried by each of said cutter arms, means for conveying an ear of corn between said knives to sever the kernels therefrom, a pair of presser arms each independently pivoted at one end to said support adjacent said bearings, said presser arms extending along parallel with said cutter arms and the free ends of said presser arms bearing against the outer sides of the free ends of said cutter arms and means for yieldingly holding said presser arms together comprising a tension spring connecting said presser arms.

3. In a machine of the character described, a support formed to provide a pair of forwardly opening stationary jaws, a pair of cutter arms one end of each of which is adapted to be inserted in one of said jaws, said jaws being formed to provide bearings for said cutter arms whereby said cutter arms are movable toward and from one another, a knife carried by each of said cutter arms, means for conveying an ear of corn between said knives to sever the kernels therefrom, and a pair of presser arms independently pivoted to said support and engaging the free ends of said cutter arms to hold said cutter arms yieldingly together.

4. In a machine of the character described, a vertical supporting plate having upper and lower openings provided therein, a supporting block projecting rearwardly from said plate between said openings, said block being formed on its upper and lower sides to provide forwardly opening stationary jaws, a pair of cutter arms one end of each of which is adapted to be inserted through one of said openings into said jaws, said jaws being formed to provide bearings for the inserted end of each of said cutter arms whereby said cutter arms are movable to and from one another, a knife carried by each of said cutter arms, means for conveying an ear of corn between said knives to sever the kernels therefrom and a pair of presser arms independently pivoted to said support and engaging the free ends of said cutter arms to hold said cutter arms yieldingly together.

5. In a machine of the character described, a support, a pair of horizontal cutter arms carried by said support the outer ends of said cutter arms being movable toward and from one another, a pair of opposing knives carried by said cutter arms, means for conveying an ear of corn past said knives to sever the kernels therefrom, spring means for yieldingly holding said arms together and a second spring means interposed between one of said arms and said support and for yieldingly supporting the free ends of both of said cutter arms whereby said cutter arms are free to float in unison.

6. In a machine of the character described, a support, a pair of horizontal cutter arms carried by said support the outer ends of said cutter arms being movable toward and from one another, a pair of opposing knives carried by said cutter arms, means for conveying an ear of corn past said knives to sever the kernels therefrom, a pair of presser arms pivoted to said support, a spring connecting said presser arms and yieldingly holding said cutter arms together and means for yieldingly supporting said cutter arms whereby said cutter arms are free to float in unison comprising a lateral arm provided on one of said presser arms and a spring connecting said last named arm and said support and supporting all of said arms.

7. In a machine of the character described, a support, a pair of parallel tool shafts arranged one above the other, means carried by said support at one end of said tool shafts for rotating said shafts in opposite directions and permitting vertical movement of the opposite ends of said shafts, conveyer wheels at the opposite ends of said shafts and adapted to receive and convey an ear of corn, means yieldingly holding said shafts together, spring means connecting said pair of shafts with said support and yieldingly supporting said pair of shafts whereby said shafts are free to float in unison and cutting means arranged adjacent said conveyer wheels and adapted to cut the kernels from the passing ears.

8. In a machine of the character described, means for conveying an ear of corn, and a device arranged in the path of said ear to sever the kernels therefrom, said device including a support, a plurality of arms, each of said arms being provided at one end with a hook shaped part adapted to engage a part of said support and be removably supported thereby, spring means yieldingly and releasably holding the free ends of said arms together, comprising a pair of latching arms pivoted to said support and engaging the outer sides of the free ends of said arms, a tension spring connecting said latching arms at one side of their pivoted mounting, said latching arms being movable to carry said spring over to the opposite sides of the pivot centers of said latching arms and stop means carried by said support and limiting the movement of said latching arms toward one another when said spring is arranged on the said opposite sides of said pivot centers and means carried at the free ends of each of said arms for severing the kernels from the passing ear.

JOHN C. McINTYRE.